(12) United States Patent
Chann et al.

(10) Patent No.: US 9,620,928 B2
(45) Date of Patent: Apr. 11, 2017

(54) CONTINUOUS WAVE OR ULTRAFAST LASERS

(75) Inventors: Bien Chann, Merrimack, NH (US); Daniel J. Ripin, Needham, MA (US); Tso Yee Fan, Belmont, MA (US); Antonio Sanchez-Rubio, Lexington, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 611 days.

(21) Appl. No.: 12/837,530

(22) Filed: Jul. 16, 2010

(65) Prior Publication Data

US 2012/0014397 A1    Jan. 19, 2012

(51) Int. Cl.
*H01S 3/13* (2006.01)
*H01S 3/23* (2006.01)

(52) U.S. Cl.
CPC .......... *H01S 3/1307* (2013.01); *H01S 3/2308* (2013.01); *H01S 3/2333* (2013.01); *H01S 3/2383* (2013.01); *H01S 3/2391* (2013.01)

(58) Field of Classification Search
CPC .... H01S 3/1307; H01S 3/2308; H01S 3/2383; H01S 3/2333; H01S 3/2391
USPC ................................ 372/29.023, 25, 29.014
See application file for complete search history.

(56) References Cited

U.S. PATENT DOCUMENTS

| | | | |
|---|---|---|---|
| 4,467,468 A | 8/1984 | Miller | |
| 4,817,207 A | 3/1989 | Smith et al. | |
| 4,961,195 A | * 10/1990 | Skupsky et al. | ............... 372/31 |
| 5,005,166 A | 4/1991 | Suzuki et al. | |

(Continued)

FOREIGN PATENT DOCUMENTS

| EP | 0938197 A2 | 8/1999 |
|---|---|---|
| JP | 2007165624 A | 6/2007 |

(Continued)

OTHER PUBLICATIONS

Augst, Steven J. et al., "Beam Combining of Ytterbium Fiber Amplifiers (Invited)," J. Optical Soc. Am. B., vol. 24, No. 8, Aug. 2007.

(Continued)

*Primary Examiner* — Michael Carter
(74) *Attorney, Agent, or Firm* — Lando & Anastasi, LLP

(57) ABSTRACT

A laser system comprises: a seed oscillator, having a seed output; dispersive optics, operative to receive the seed output and divide the seed output into spectrally separate seed components; an array of individually addressable, phase adjustable laser amplifiers corresponding to the spectrally separate components, each laser amplifier receiving as its seed one of the spectrally separate seed components and producing one of the spectrally separate amplified components; and phase actuators controlling the individually addressable, phase adjustable laser amplifiers. A method of operating a laser system comprises: generating a seed signal; dividing the seed signal into spectrally separate component signals; amplifying the spectrally separate component signals; recombining the spectrally separate component signals into an amplified output; and controlling phases of the amplified spectrally separate component signals. Both single-pass and double-pass amplifier array versions are disclosed.

17 Claims, 3 Drawing Sheets

(56) References Cited

U.S. PATENT DOCUMENTS

| | | | |
|---|---|---|---|
| 5,009,658 | A | 4/1991 | Damgaard-Iversen et al. |
| 5,010,543 | A | 4/1991 | Hill |
| 5,076,672 | A | 12/1991 | Tsuda et al. |
| 5,095,487 | A | 3/1992 | Meyerhofer et al. |
| 5,319,484 | A | 6/1994 | Jacob et al. |
| 5,325,222 | A | 6/1994 | Jacob et al. |
| 5,329,396 | A | 7/1994 | Fishman et al. |
| 5,404,240 | A | 4/1995 | Nishio et al. |
| 5,589,967 | A | 12/1996 | Auffret |
| 5,631,758 | A | 5/1997 | Knox et al. |
| 5,694,408 | A * | 12/1997 | Bott et al. ............ 372/6 |
| 5,861,965 | A | 1/1999 | Koren et al. |
| 5,892,607 | A | 4/1999 | Atlas |
| 6,061,369 | A | 5/2000 | Conradi |
| 6,100,831 | A | 8/2000 | Frankel |
| 6,167,075 | A | 12/2000 | Craig et al. |
| 6,192,062 | B1 | 2/2001 | Sanchez-Rubio et al. |
| 6,212,310 | B1 | 4/2001 | Waarts et al. |
| 6,252,693 | B1 | 6/2001 | Blauvelt |
| 6,275,632 | B1 | 8/2001 | Waarts et al. |
| 6,307,668 | B1 * | 10/2001 | Bastien et al. ............ 359/337.1 |
| 6,327,068 | B1 * | 12/2001 | Silberberg et al. ............ 359/239 |
| 6,327,292 | B1 | 12/2001 | Sanchez-Rubio et al. |
| 6,330,388 | B1 | 12/2001 | Bendett et al. |
| 6,356,576 | B1 | 3/2002 | Smith |
| 6,381,048 | B1 | 4/2002 | Chraplyvy et al. |
| 6,400,871 | B1 | 6/2002 | Minden |
| 6,434,175 | B1 | 8/2002 | Zah |
| 6,570,704 | B2 | 5/2003 | Palese |
| RE38,289 | E | 10/2003 | Bergano |
| 6,678,294 | B1 | 1/2004 | Komine et al. |
| 6,763,054 | B2 | 7/2004 | Whitley |
| 6,775,478 | B2 | 8/2004 | Suzuki et al. |
| 7,020,168 | B2 | 3/2006 | Bernasconi et al. |
| 7,110,168 | B2 | 9/2006 | Lee et al. |
| 7,199,924 | B1 | 4/2007 | Brown et al. |
| 7,239,777 | B1 | 7/2007 | Christensen et al. |
| 7,271,949 | B2 | 9/2007 | Kim et al. |
| 7,272,319 | B1 | 9/2007 | Piccirilli et al. |
| 7,298,771 | B2 | 11/2007 | Volodin et al. |
| 7,339,727 | B1 | 3/2008 | Rothenberg et al. |
| 7,340,172 | B2 | 3/2008 | Giles et al. |
| 7,346,085 | B1 | 3/2008 | Rothenberg et al. |
| 7,376,349 | B2 | 5/2008 | Ionov et al. |
| 7,436,588 | B2 | 10/2008 | Rothenberg et al. |
| 7,440,174 | B2 | 10/2008 | Rice et al. |
| 7,468,832 | B2 | 12/2008 | Rothenberg et al. |
| 7,574,139 | B2 | 8/2009 | Fu et al. |
| 7,620,324 | B2 | 11/2009 | Minato et al. |
| 7,653,096 | B2 | 1/2010 | Kawai |
| 7,702,240 | B2 | 4/2010 | Minato |
| 7,764,720 | B1 | 7/2010 | Bronder et al. |
| 7,953,129 | B2 | 5/2011 | Kawai |
| 8,023,538 | B2 | 9/2011 | Marcinkevicius et al. |
| 8,125,704 | B2 | 2/2012 | Mielke et al. |
| 8,179,594 | B1 | 5/2012 | Tidwell et al. |
| 8,184,361 | B2 | 5/2012 | Rothenberg et al. |
| 8,184,363 | B2 | 5/2012 | Rothenberg |
| 2001/0017720 | A1 | 8/2001 | Hait |
| 2001/0017721 | A1 | 8/2001 | Hait |
| 2002/0126346 | A1 | 9/2002 | Suzuki et al. |
| 2003/0095737 | A1 | 5/2003 | Welch et al. |
| 2003/0219205 | A1 | 11/2003 | Volodin et al. |
| 2004/0052278 | A1 | 3/2004 | Kane et al. |
| 2004/0057475 | A1 * | 3/2004 | Frankel et al. ............ 372/25 |
| 2004/0095983 | A1 | 5/2004 | Whitley |
| 2005/0002424 | A1 | 1/2005 | Bernasconi et al. |
| 2006/0120418 | A1 | 6/2006 | Harter et al. |
| 2006/0153254 | A1 | 7/2006 | Franjic et al. |
| 2006/0171428 | A1 | 8/2006 | Volodin |
| 2006/0257150 | A1 | 11/2006 | Tsuchiya et al. |
| 2006/0291862 | A1 | 12/2006 | Kawai |
| 2007/0078449 | A1 | 4/2007 | Hayashi et al. |
| 2007/0086010 | A1 | 4/2007 | Rothenberg |
| 2007/0165624 | A1 | 6/2007 | Volodin |
| 2007/0201795 | A1 | 8/2007 | Rice et al. |
| 2007/0280325 | A1 * | 12/2007 | Wang ............ 372/72 |
| 2008/0084598 | A1 | 4/2008 | Rothenberg et al. |
| 2008/0084605 | A1 | 4/2008 | Rothenberg et al. |
| 2008/0085128 | A1 | 4/2008 | Rothenberg et al. |
| 2008/0089698 | A1 * | 4/2008 | Jiang et al. ............ 398/189 |
| 2009/0201575 | A1 | 8/2009 | Fermann et al. |
| 2010/0073658 | A1 | 3/2010 | Kawai |
| 2010/0110556 | A1 | 5/2010 | Chann et al. |
| 2011/0032602 | A1 | 2/2011 | Rothenberg |
| 2011/0032603 | A1 | 2/2011 | Rothenberg |
| 2011/0032604 | A1 | 2/2011 | Rothenberg et al. |
| 2011/0147566 | A1 | 6/2011 | Furuya et al. |
| 2012/0014397 | A1 | 1/2012 | Chann et al. |
| 2012/0188626 | A1 | 7/2012 | Rothenberg et al. |
| 2012/0200439 | A1 | 8/2012 | Hartl et al. |
| 2012/0212801 | A1 | 8/2012 | Rothenberg |
| 2012/0212802 | A1 | 8/2012 | Rothenberg et al. |
| 2012/0219021 | A1 | 8/2012 | Lippey et al. |
| 2013/0063808 | A1 | 3/2013 | Rothenberg |

FOREIGN PATENT DOCUMENTS

| | | |
|---|---|---|
| WO | 02071119 A1 | 9/2002 |
| WO | 2006012463 A2 | 2/2006 |
| WO | 2006097531 A1 | 9/2006 |
| WO | 2008127451 A2 | 10/2008 |
| WO | 2011109753 A1 | 9/2011 |

OTHER PUBLICATIONS

Bates, Harry et al., "Picosecond Pulse Stacking in Calcite," Applied Optics, vol. 18, No. 7, Apr. 1, 1979.

Clarkson, W.A. et al., "Two-Mirror Beam-Shaping Technique for High-Power Diode Bars," Optics Letters, vol. 21, No. 6, Mar. 15, 1996.

Dawson, Jay W. et al., "Analysis of the Scalability of Diffraction-Limited Fiber Lasers and Amplifiers to High Average Power," Optics Express, vol. 16, No. 17, Aug. 18, 2008.

Fan, T.Y., "Laser Beam Combining for High-Power, High-Radiance Sources," IEEE Journal of Selected Topics in Quantum Electronics, vol. 11, No. 3, May/Jun. 2005.

Loftus, Thomas H. et al., "Spectrally Beam-Combined Fiber Lasers for High-Average-Power Applications," IEEE Journal of Selected Topics in Quantum Electronics, vol. 13, No. 3, May/Jun. 2007.

Zhou, Shian et al., "Divided-Pulse Amplification of Ultrashort Pulses," Optics Letters, vol. 32, No. 7, Apr. 1, 2007.

Chann, B. et al. "Frequency-Narrowed External-Cavity Diode-Laser-Array Bar" ,Optics Letters, vol. 25. No. 18, Sep. 15, 2000.

Gopinath, J.T. et al., "1450-nm High-Brightness Wavelength-Beam Combined Diode Laser Array" Optics Express, vol. 16, No. 13, Jun. 23, 2008.

Zhu, H. et al., "Spectrally Narrowed External-Cavity High-Power Stack of Laser Diode Arrays", Optics Letters, vol. 30, No. 11, Jun. 1, 2005.

* cited by examiner

CONTINUOUS WAVE OR ULTRAFAST LASERS

FEDERALLY SPONSORED RESEARCH

This invention was made with Government support under Air Force contract, FA8721-05-C-0002, Program #221. The Government may have certain rights to this invention.

BACKGROUND OF INVENTION

1. Field of Invention

The present invention relates to short pulse generation by diode and fiber lasers using mode-locking or Q-switching technologies. In particular, the invention relates to such systems employing plural amplifiers arranged to reduce the effects of non-linearities on gain-bandwidth and power output.

2. Discussion of Related Art

Short pulse generation by diode and fiber lasers employing mode-locking or Q-switching technologies have been an active area of research in the last three decades. The performance of such systems, however, has yet to approach other solid state lasers.

SUMMARY OF INVENTION

It has been observed that the poor performance of conventional short-pulse mode-locking or Q-switching systems is mainly due to small cross section area and long interaction length of the fibers used. In fiber lasers, the pulse energy is limited to about one milli-Joule, with a few Watts of average power. In semiconductor lasers, the pulse energy is even more severely limited, typically to the pico-Joule range with a few milli-Watts of average power. The maximum pulse energy that can be extracted from semiconductor laser is given by the pulse gain saturation energy:

$$E_{sat} = \frac{\hbar\omega_0 A}{\Gamma \frac{dg}{dN}}$$

where $\omega_0$ is the center frequency, A is the cross-section area of the active region, $\Gamma$ is the confinement of the mode in the active region, and dg/dN is the material differential gain. A typical single-mode diode laser has cross section area, A, of about 5 $\mu m^2$ and a typical fiber laser has a cross section area, A, of about 400 $\mu m^2$. On the other hand, a typical bulk solid state laser has section area 10,000,000 $\mu m^2$ or greater. Furthermore, the performance of conventional systems has been found to be severely limited by non-linearities. In semiconductor lasers, if they were limited only by the gain-bandwidth, the gain-bandwidth can support pulses having a duration as short as a few femto-seconds, but due to nonlinear phase changes associated with gain-saturation, the pulse length that can actually be supported is longer, limited to a duration of a few pico-seconds.

According to aspects of one embodiment, a laser system comprises: a seed oscillator, having a seed output; dispersive optics, operative to receive the seed output and divide the seed output into spectrally separate seed components; an array of individually addressable, phase adjustable laser amplifiers corresponding to the spectrally separate components, each laser amplifier receiving as its seed one of the spectrally separate seed components and producing one of the spectrally separate amplified components; and phase actuators controlling the individually addressable, phase adjustable laser amplifiers. In the laser system, the individually addressable, phase adjustable laser amplifiers may double-pass the spectrally separate seed components, and the dispersive optics may then combine the spectrally separate amplified components into an output beam. Such a system also may include an isolator disposed in a position to pass the seed output from the seed oscillator to the dispersive optics, and to redirect the output beam away from the seed oscillator. Alternatively, the individually addressable, phase adjustable laser amplifiers may direct the spectrally separate amplified components back along a path separate from that along which the spectrally separate seed components are received, in which case there may be separate dispersive optics, operative to receive the separate amplified components from the phase adjustable laser amplifiers and combining the spectrally separate amplified components into an output beam. According to another variation, the laser system may further include: a sampler receiving the amplified output and producing a sampled output; a non-linear crystal receiving the sampled output; and a photo-detector; whereby the photo-detector produces an output representative of detected phases of the spectrally separate amplified components, the output of the photo detector being applied to the phase actuators to control the individually addressable phase adjustable laser amplifiers. According to a further variation, the laser system may yet further include: a stochastic parallel gradient descent phase controller receiving the photo-detector output and controlling the individually addressable phase adjustable laser amplifiers. Alternatively, the laser system may yet further include: a self-synchronous coherent beam combining phase controller receiving the photo-detector output and controlling the individually addressable phase adjustable laser amplifiers. Yet alternatively, the laser system may yet further include: a phase controller constructed and arranged to produce a mode-locked output at the amplified output. Even yet alternatively, the laser system may further include: a phase controller constructed and arranged to produce a phase randomized, continuous wave output at the amplified output. According to other aspects of the embodiment of the laser system the dispersive optics further comprise 1-D dispersive optics. According to yet other aspects of the embodiment of the laser system the dispersive optics further comprise 2-D dispersive optics. According to even yet other aspects of the embodiment of the laser system the dispersive optics further comprise wavelength beam combining optics.

According to aspects of another embodiment, a method of operating a laser system comprises: generating a seed signal; dividing the seed signal into spectrally separate component signals; amplifying the spectrally separate component signals; recombining the spectrally separate component signals into an amplified output; and controlling phases of the amplified spectrally separate component signals. According to other aspects of this embodiment, controlling the phases may further include: adjusting the phases into alignment so the amplified output is a mode-locked signal. According to yet other aspects of this embodiment, controlling the phases may further include: adjusting the phases into random relationship so the amplified output is a continuous wave signal. In another variation, amplifying may further comprise double-passing the spectrally separate component signals through an amplifier array. In that case, dividing the seed signal may further comprise using dispersive optics; and recombining the spectrally separate component signals may further comprise using the dispersive optics used for dividing. Amplifying may alternatively comprise single-passing the spectrally separate component signals through an amplifier array.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
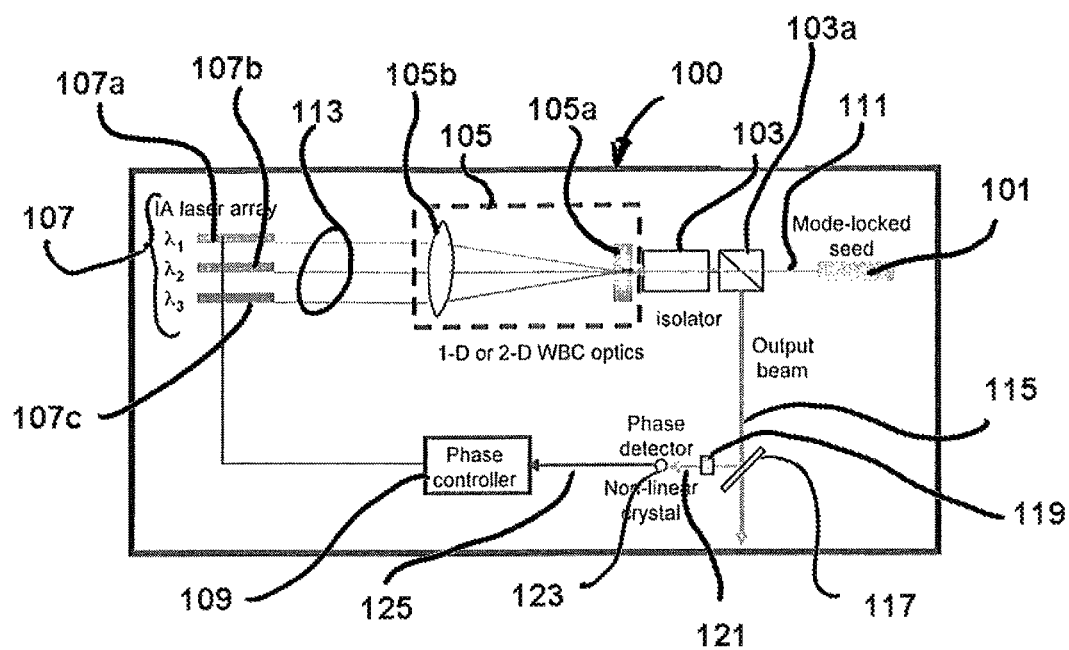
FIG. 1 is a schematic block diagram of a folded optical system according to aspects of embodiments of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

FIG. 1 is a schematic block diagram showing a basic folded architecture for generating high power CW or ultrafast lasers according to aspects of embodiments of the invention. Systems according to the illustrated basic architecture, 100, include a mode-locked master oscillator, 101; a Faraday isolator, 103, including an input polarizer which separates and redirects the return signal away from oscillator, 101, as output beam, 115; wavelength separating optics, 105, including dispersive optics, e.g. a prism or prisms, diffraction grating, or other one-dimensional (1-D) or two-dimensional (2-D) dispersive optics such as wavelength beam combining or WBC optics, 105a, followed by a Fourier transform lens, collimating lens, collimating mirror, or other beam redirecting optic, 105b; and, 1-D or 2-D laser amplifier array, 107, with phase actuators, 109. The output beam, 111, from the mode-locked master oscillator is split into its spectral components, 113, by the 1-D or 2-D dispersive optics, 105a. Each spectral component is mapped by Fourier transform lens, 105b, onto an element in the laser amplifier array, 107. In this array, 107, each array element, 107a, 107b, and 107c, is individually addressable so that the individual phases can be actuated independently. Although three amplifiers, 107a, 107b, and 107c, comprise array, 107, in this example, any arbitrary number of amplifiers can be used. Each amplifier, 107a, 107b, and 107c, is seeded by one or more than one spectral components. The spectral components are amplified by the amplifier array, 107. Each amplifier, 107a, 107b, and 107c, is double-passed; i.e., the beam passes through the amplifier twice, once in each direction. Upon the separate spectral components output by the amplifiers, 107a, 107b, and 107c, passing back through the wavelength separating optics, 105, the output becomes a single beam, and then the output path, 115, is separated from the input path, i.e., the output beam, 111, of the seed oscillator, by the Faraday isolator, 103. If the phases of the amplifiers, 107a, 107b, and 107c, are randomized then the output will be continuous wave (CW). If there is a fixed phase relationship amongst the amplifiers, 107a, 107b, and 107c, then the output will be mode-locked. To ensure that there is a fixed phase relationship amongst the amplifiers, 107a, 107b, and 107c, the phases of the output beam are detected and corrected. This can be done, for example, using a self-referenced or self-synchronous coherent beam combining technique (LOCSET) or stochastic parallel gradient descent (SPGD) technique. The individually addressed phase actuation as shown in FIG. 1 can be done, for example, by changing the current (for diode lasers) of each amplifier. Other phase actuators can also be used. FIG. 1 shows one architecture using an SPGD phase controller. The output beam, 115, is sampled, 117, and focused onto a single non-linear crystal, 119. The output, 121, from the non-linear crystal, 119, is detected by a single photo-detector, 123. The output, 125, of the detector, 123, is passed to the SPGD phase controller, 109. Non-linear conversion is highly dependent on peak power and, thus, phasing is accomplished by maximizing the output from the photo-detector. To generate CW power, the output, 125, from the non-linear crystal, 119, is minimized.

In the described, folded embodiment the amplifier array, 107, and wavelength separating optics, 105, are each used twice, as the beam traverses them first in one direction and then returns in the opposite direction. Thus, after the wavelength-separated beams pass through the amplifier array, 107, once in each direction, they then pass through optics, 105, which recombines the amplified beams into a single amplified beam. The isolator, 103, serves to extract the amplified beam using beam polarization to permit the output beam, 115, to be selectively directed out by polarizer, 103a, providing a high rejection ratio of power in the output beam, 115, to power leaking back to the seed oscillator, 101. Preventing power leaking back to the seed oscillator, 101, is important to prevent undesirable feedback effects in the oscillator.

Figure 2:
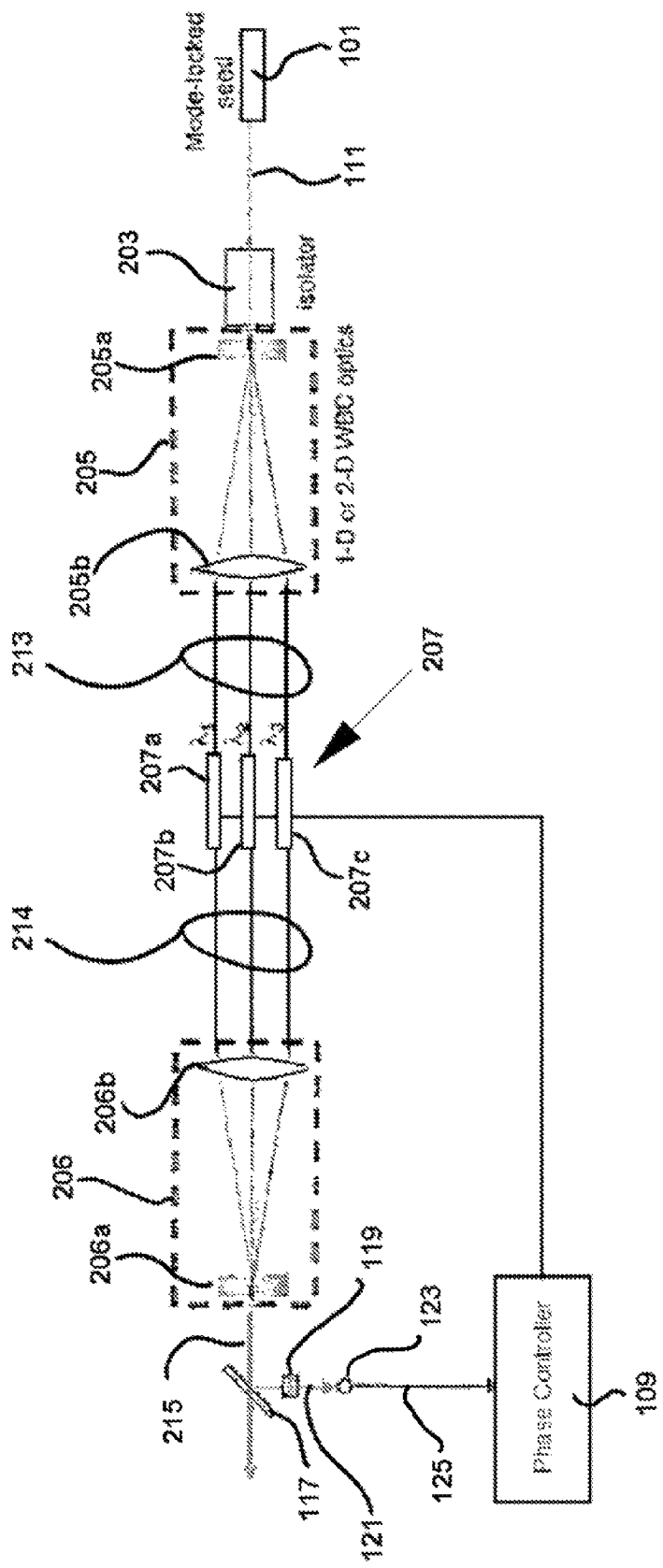
FIG. 2 is a schematic block diagram of an unfolded optical system according to aspects of embodiments of the present invention.

FIG. 2 is a schematic block diagram showing a basic unfolded architecture for generating high power CW or ultrafast lasers according to aspects of embodiments of the invention. The principles of operation of these embodiments, now described, are similar to those shown and described in connection with FIG. 1; however, in unfolded embodiments, the amplified beam does not need to pass through an isolator. An isolator is still desired between the mode-locked seed and the rest of the system to prevent any unwanted feedback from reaching, and affecting performance of, the seed oscillator.

Systems according to the illustrated unfolded architecture include a mode-locked master oscillator, 101; a Faraday isolator, 203, with integral polarizer (not shown) which must reject any returned beam before it reaches the oscillator, 101; wavelength separating optics, 205, including dispersive optics, e.g. a prism or prisms, diffraction grating, or other one-dimensional (1-D) or two-dimensional (2-D) dispersive optics such as wavelength beam combining or WBC optics, 205a, followed by a Fourier transform lens, collimating lens, collimating mirror, or other beam redirecting optic, 205b; and, 1-D or 2-D laser amplifier array, 207, with phase actuators, 109. The output beam, 111, from the mode-locked master oscillator is split into its spectral components, 213, by the 1-D or 2-D dispersive optics, 205a. Each spectral component is mapped by Fourier transform lens, 205b, onto an element in the laser amplifier array, 207. In this array, 207, each array element, 207a, 207b, and 207c, is individually addressable so that the individual phases can be actuated independently. Although three amplifiers, 207a, 207b, and 207c, comprise array, 207, in this example, any arbitrary number of amplifiers can be used. Each amplifier, 207a, 207b, and 207c, is seeded by one or more than one spectral components. The spectral components are amplified by the amplifier array, 207. Unlike in the embodiments illustrated by FIG. 1, each amplifier, 207a, 207b, and 207c, is single-passed; i.e., the beam passes through the amplifier only once, in one direction. Upon the separate spectral components output, 214, by the amplifiers, 207a, 207b, and 207c, passing through the wavelength combining optics, 206, the output becomes a single beam. A Fourier transform lens, 206b, redirects the output beams, 214, onto dispersive optics, 206a, where they are combined into a single output beam, 215. If the phases of the amplifiers, 207a, 207b, and 207c, are randomized then the output will be continuous wave (CW). If there is a fixed phase relationship amongst the amplifiers, 207a, 207b, and 207c, then the output will be mode-locked. To ensure that there is a fixed phase relationship amongst the amplifiers, 207a, 207b, and 207c, the phases of the output beam are detected and corrected. This can be done, for example, using a self-referenced or self-synchronous coherent beam combining technique (LOCSET) or stochastic parallel gradient descent (SPGD) technique. The individually addressed phase actuation as shown in FIG. 2 can be done, for example, by changing the current (for diode lasers) of each amplifier. Other phase actuators can also be used. FIG. 2, like FIG. 1, shows one architecture using an SPGD phase controller. The output beam, 215, is sampled, 117, as described in connection with FIG. 1, and focused onto a single non-linear crystal, 119. The output, 121, from the non-linear crystal, 119, is detected by a single photo-detector, 123. The output, 125, of the detector, 123, is passed to the SPGD phase controller, 109. Non-linear conversion is highly dependent on peak power and, thus, phasing is accomplished by maximizing the output from the photo-detector. To generate CW power, the output, 125, from the non-linear crystal, 119, is minimized.

Amplifier arrays 107 and 207 can take several forms. They are often constructed using conventional semiconductor processing techniques as a waveguide with optical gain formed on the surface of a semiconductor wafer. The ends of the waveguide are cleaved to form facets at each end of the waveguide when the wafer is divided into individual amplifier arrays. If the waveguide is to be used in a folded system, where beams pass through the waveguide once in each direction, the facet at one end of the waveguide can be coated with a high-reflectivity optical coating, while the facet at the other end is coated with an anti-reflective (AR) coating. If the amplifier waveguide is normal to the facets, then a high-performance AR coating is required to prevent self-oscillation due to residual facet reflectivity. In the case of a waveguide used in an unfolded system, high-performance AR coatings are required on both facets to prevent self-oscillation due to residual facet reflectivity.

The high-performance requirement on the AR coating can be relaxed if the waveguide is designed to receive (or output) beams from (or to) a direction that is off normal to the facet. In folded embodiments this may be achieved by employing a curved waveguide with the AR coated facet being off normal and the opposite facet having the high reflectivity coating being normal to the direction of beam travel. In unfolded embodiments the waveguide may be straight, but having an axis that is angled to the facets.

Figure 3:
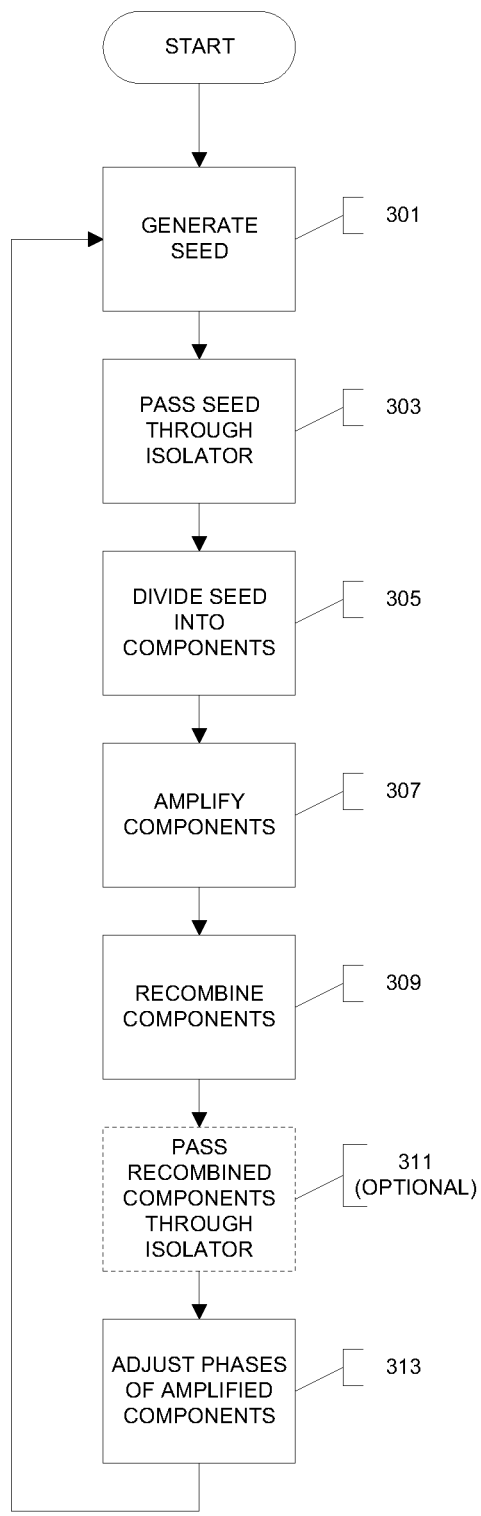
FIG. 3 is a flow chart illustrating methods according to aspects of embodiments of the present invention.

FIG. 3 illustrates, using a flow chart, a method according to aspects of an embodiment of the invention. According to this method, an optical seed signal is generated, 301, and passed into an optical system. The seed signal is first passed through an isolator, 303, and then divided into spectrally separate components, 305. This may be done using a Faraday isolator and dispersive optics, respectively, as described above in connection with FIG. 1. The individual spectral components are amplified, 307, and then recombined, 309, for example by returning them to the dispersive optics, where they are recombined by passing backwards through the dispersive optics toward the isolator. Alternatively, recombination, 309, can take place without folding the return beam back on the input. The recombined components are then, if a folded embodiment, passed back through the isolator, 311, after which an output beam can be extracted. Phases of the amplified components are adjusted, 313, for example by measuring the phase differences at the output beam and adjusting individually addressable amplifiers used at step 307. The method illustrated is performed as a continuous process, rather than serially as represented in the flow chart. Of particular note, the phase adjustment is preferably a continuous feedback process.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A laser system, comprising:
   a seed oscillator, having a seed output;
   dispersive optics, operative to receive the seed output and divide the seed output into spectrally separate seed components;
   an array of individually addressable, phase adjustable laser amplifiers corresponding to the spectrally separate seed components, each laser amplifier receiving as its seed one of the spectrally separate seed components and producing one of the spectrally separate amplified components; and
   phase actuators controlling the individually addressable, phase adjustable laser amplifiers;
   wherein the dispersive optics are further configured to combine the spectrally separate amplified components into an output beam.

2. The laser system of claim 1, wherein the individually addressable, phase adjustable laser amplifiers double-pass the spectrally separate seed components, and wherein the dispersive optics combine the spectrally separate amplified components into an output beam, further comprising:
   an isolator disposed in a position to pass the seed output from the seed oscillator to the dispersive optics, and to redirect the output beam away from the seed oscillator.

3. The laser system of claim 1, wherein the individually addressable, phase adjustable laser amplifiers direct the spectrally separate amplified components along a path separate from that along which the spectrally separate seed components are received, further comprising:
   dispersive optics, operative to receive the separate amplified components from the phase adjustable laser amplifiers and combining the spectrally separate amplified components into an output beam.

4. The laser system of claim 1, further comprising:
   a sampler receiving the amplified output and producing a sampled output;

a non-linear crystal receiving the sampled output; and a photo-detector;

configured to produce an output representative of detected phases of the spectrally separate amplified components, the output of the photo detector being applied to the phase actuators to control the individually addressable phase adjustable lasers.

5. The laser system of claim 4, further comprising:

a stochastic parallel gradient descent phase controller receiving the photo-detector output and controlling the individually addressable phase adjustable lasers.

6. The laser system of claim 4, further comprising:

a self-synchronous coherent beam combining phase controller receiving the photo-detector output and controlling the individually addressable phase adjustable lasers.

7. The laser system of claim 4, further comprising:

a phase controller constructed and arranged to produce a mode-locked output at the amplified output.

8. The laser system of claim 4, further comprising:

a phase controller constructed and arranged to produce a phase randomized, continuous wave output at the amplified output.

9. The laser system of claim 1, wherein the dispersive optics further comprise 1-D dispersive optics.

10. The laser system of claim 1, wherein the dispersive optics further comprise 2-D dispersive optics.

11. The laser system of claim 1, wherein the dispersive optics further comprise wavelength beam combining optics.

12. A method of operating a laser system comprising:

generating a seed signal;

dividing the seed signal into spectrally separate component signals;

amplifying the spectrally separate component signals within at least one amplifier of a plurality of amplifiers;

recombining the spectrally separate component signals into an amplified output; and controlling phases of the amplified spectrally separate component signals within the at least one amplifier of the plurality of amplifiers.

13. The method of claim 12, controlling the phases further comprising:

adjusting the phases into alignment so the amplified output is a mode-locked signal.

14. The method of claim 12, controlling the phases further comprising:

adjusting the phases into random relationship so the amplified output is a continuous wave signal.

15. The method of claim 12, wherein amplifying further comprises:

double-passing the spectrally separate component signals through an amplifier array.

16. The method of claim 15, wherein:

dividing the seed signal further comprises using dispersive optics; and recombining the spectrally separate component signals further comprises using the dispersive optics used for dividing.

17. The method of claim 12, wherein amplifying further comprises:

single-passing the spectrally separate component signals through an amplifier array.

* * * * *